United States Patent
Devraj et al.

(10) Patent No.: US 7,571,225 B2
(45) Date of Patent: Aug. 4, 2009

(54) STANDARD OPERATING PROCEDURE AUTOMATION IN DATABASE ADMINISTRATION

(75) Inventors: Venkat S. Devraj, Erie, CO (US); Rainier L. Luistro, Centennial, CO (US)

(73) Assignee: Stratavia Corporation, Denver, CO (US)

( * ) Notice: Subject to any disclaimer, the term of this patent is extended or adjusted under 35 U.S.C. 154(b) by 16 days.

(21) Appl. No.: 11/770,454

(22) Filed: Jun. 28, 2007

(65) Prior Publication Data

US 2008/0016123 A1 Jan. 17, 2008

Related U.S. Application Data

(60) Provisional application No. 60/806,226, filed on Jun. 29, 2006.

(51) Int. Cl.
*G06F 15/173* (2006.01)
*G06F 7/00* (2006.01)

(52) U.S. Cl. ...................... 709/223; 707/100
(58) Field of Classification Search ................ 709/223
See application file for complete search history.

(56) References Cited

U.S. PATENT DOCUMENTS

| | | | |
|---|---|---|---|
| 6,356,917 B1 * | 3/2002 | Dempsey et al. | 707/202 |
| 6,581,066 B1 * | 6/2003 | Wang Baldonado et al. | 707/102 |
| 6,738,748 B2 * | 5/2004 | Wetzer | 705/9 |
| 6,996,576 B2 * | 2/2006 | Vos et al. | 707/103 R |
| 7,318,224 B2 * | 1/2008 | Honarvar et al. | 717/170 |
| 2003/0153991 A1 * | 8/2003 | Visser et al. | 700/79 |
| 2003/0177160 A1 * | 9/2003 | Chiu et al. | 709/100 |
| 2003/0233438 A1 * | 12/2003 | Hutchinson et al. | 709/223 |
| 2004/0194107 A1 * | 9/2004 | Masuoka | 718/100 |
| 2004/0236757 A1 * | 11/2004 | Caccavale et al. | 707/100 |
| 2005/0138606 A1 * | 6/2005 | Basu et al. | 717/136 |
| 2006/0009991 A1 * | 1/2006 | Jeng et al. | 705/1 |
| 2006/0026212 A1 * | 2/2006 | Tsukerman et al. | 707/200 |
| 2006/0149707 A1 * | 7/2006 | Mitchell et al. | 707/2 |
| 2006/0294255 A1 * | 12/2006 | Chen | 709/240 |

* cited by examiner

*Primary Examiner*—Jeffrey Pwu
*Assistant Examiner*—Benjamin R Bruckart
(74) *Attorney, Agent, or Firm*—Michael C. Martensen; Hogan & Hartson LLP

(57) ABSTRACT

A plurality of modules and/or engines to manage the operation and health of a plurality of databases through the use of standard operating procedures (SOPs). Modules of the present invention are configured to assist database administrators to create, and thereafter store in an accessible memory resource, a plurality of SOPs. These SOPs define procedures to address various database informational states. Database state information is monitored, collected and analyzed to determine, based either on a predetermined rule set or on manual input from an authorized database administrator, whether one or more SOPs will be applied to a particular database environment. These SOPs can be combined and/or executed on the database either automatically or manually.

41 Claims, 6 Drawing Sheets

STANDARD OPERATING PROCEDURE AUTOMATION IN DATABASE ADMINISTRATION

RELATED APPLICATIONS

This application claims the benefit of U.S. Provisional Application No. 60/806,226 filed Jun. 29, 2006.

BACKGROUND OF THE INVENTION

1. Field of the Invention

Embodiments of the present invention relate, in general, to management of database applications, and particularly to establishing standard operating procedures to automate database administration.

2. Relevant Background

Many commercial applications, including financial management systems, payroll applications, customer relationship management systems and enterprise resource planning systems utilize one or more of the database applications such as Oracle, DB2, MySQL and SQL Server. Enterprises worldwide spend billions of dollars annually in managing and administering these database applications. Database administration is the process of establishing computerized databases, and ensuring their integrity, recoverability, security, availability, reliability, scalability and performance. Database administrators ("DBAs") work with database management system's software and determine ways to organize, store and retrieve data. They identify user requirements, set up computer databases, and test and coordinate modifications to the computer database systems. Because they also may design and implement system security, database administrators often plan and coordinate security measures as well. With the volume of sensitive data generated growing rapidly, data integrity, backup systems, and database security have become increasingly important aspects of the job of database administrators. While certain tools are used to assist in the completion of some of these tasks, the bulk of the work today is done manually.

The average database environment involves one or more DBAs, and specific software tools and scripts to assist these DBAs to monitor and maintain the databases. The larger the environment, the higher the number of DBAs and tools and scripts in use. These tools primarily assist with monitoring the databases and/or provide a graphical user interface to assist in performing a given task without the DBA having to remember the underlying computer command syntax. While this is useful, the majority of the work has to be manually determined, performed and managed by the DBA. This is because the work is typically driven by user requests, environmental changes, change control requests, configuration management requests, release management requests and so on—many of which require human DBA intervention to communicate with external users and other administrators such as Systems Administrators, Storage Administrators, Network Administrations and Application Support personnel. Furthermore, these DBAs are often separated by geography and time zones. As such, their work habits differ resulting in lacking standardization of work procedures and inconsistent results. It is common to find a team of three DBAs having three different approaches and/or methods to work on the same task in their given environment. This causes significant differences in quality of work and allows human errors to alter the reliability of the product.

As with most processes involving human interaction, some DBAs tend to be better than others. Often these presumably senior DBAs are busy with tasks such as low-level and mundane caring and nurturing of the databases and, therefore, do not have sufficient time to engage with business users to better understand where a business is going so as to architect and tune the database environment accordingly to scale with the business. Many critical proactive tasks such as capacity planning, physical modeling, application/database optimization, operating system/database optimization and other areas of proactive performance management are simply not accomplished due to constraints on the DBA's time.

The tools by which DBAs practice their trade vary widely. As indicated earlier, generally these tools can be classified into two broad categories. The first category is that of monitoring and alerting tools. Based on pre-established criteria, these tools monitor the performance of a particular database and upon meeting or exceeding a pre-defined threshold, an alert is sent to the DBA. The DBA can then assess the alert and, when necessary, alter the database environment either immediately or per a pre-established maintenance window. In the situation in which a database needs modification, the second class of tools is introduced. This second class of tool is known in the art as an ad-hoc task performance tool. Once alerted to a problem, a DBA uses a variety of ad-hoc task performance tools to manipulate the database. Unfortunately, there is no standard approach as to what modifications should be made or the process by which to make these modifications. The steps taken by the DBA are purely a function of the experience and creativity of that individual DBA. Therefore, the same problem identified by a monitoring tool alerting two separate DBAs may result in two completely different and perhaps incompatible solutions creating an even wider database failure.

DBAs are one of the most expensive resources in a typical Information Technology organization. Enterprises typically strive to have each DBA adhere to a standard of work based on best practices as defined by the senior-most DBAs in the enterprise. Yet these best practices are only as good as the tenure of the defining senior-most DBA and the willingness and/or capability of a junior DBA to adhere to these standards. The ability for DBAs to understand the state of the database environment at all times and acknowledge any deviations in performance of the database remains a challenge, especially for junior DBAs. Achieving consistent and reliable database management remains a challenge for as the value of DBAs increase so too does the mobility of the work force. Enterprises continue to search for a means to standardize and, when possible, automate the work of the entire DBA team thus freeing the members of the team to take on the more proactive database management tasks.

SUMMARY OF THE INVENTION

Briefly stated, embodiments of the present invention involve database administration and more specifically systems and methods for capturing best practices of database administrators in the form of standard operating procedures ("SOPs") and applying these SOPs in an automatic manner to a wide variety of databases. One embodiment of the present invention comprises a plurality of modules and/or engines that manage the operation and health of a database. According to one embodiment of the present invention, one such module is configured to assist senior database administrators to create, and thereafter store in an accessible memory resource, a plurality of SOPs. In anther embodiment of the present invention this memory resource may be a central repository. These SOPs define procedures to address various database informational states. While many of the SOPs are specific to a particular type of database structure, others are compatible with multiple forms of databases. Each of the SOPs identified as being compatible with a particular type of database is compatible with each other SOP configured for that database type. These SOPs can be combined either automatically or manually and applied to databases to provide consistent and reliable database operations.

Another aspect of the present invention includes a module to monitor database informational states and database environmental policies. The present invention includes the capability to monitor the state of a database and to collect information about that state. The information is then conveyed back to central repository wherein it is stored and/or analyzed to determine the health of the database, identify any deviations, and execute one or more SOPs to correct the deviation in conformance with certain policies associated with that database environment. According to another aspect of the present invention, alerts or notifications are generated based on a rule set when the informational state of a database reaches or exceeds pre-defined thresholds or deviations from a pre-established baseline. The alert can trigger an automatic response by the system of the present invention by executing one or more SOPs in the associated database(s) and/or be presented to a database administrator for manual intervention.

According to another aspect of the present invention the system can receive from a database administrator or other authorized user a tasking request that identifies one or more SOPs directed at accomplishing a particular modification of one or more databases. These tasks can include, but are not limited to, database backup, database refreshes or database cloning, database storage configuration adjustment, management of database memory resource space, database coalescing, database patching, database upgrades, data migrations, database server migrations, and database rebuilding or de-fragmenting. SOPs addressing these and other issues can be retrieved from a storage resource and, if necessary, linked with other compatible SOPs so as to accomplish a desired modification to a particular database. Once selected and retrieved, the SOPs are, according to one aspect of the present invention, conveyed to the appropriate database and executed so as to achieve the desired modifications.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

Figure 1:
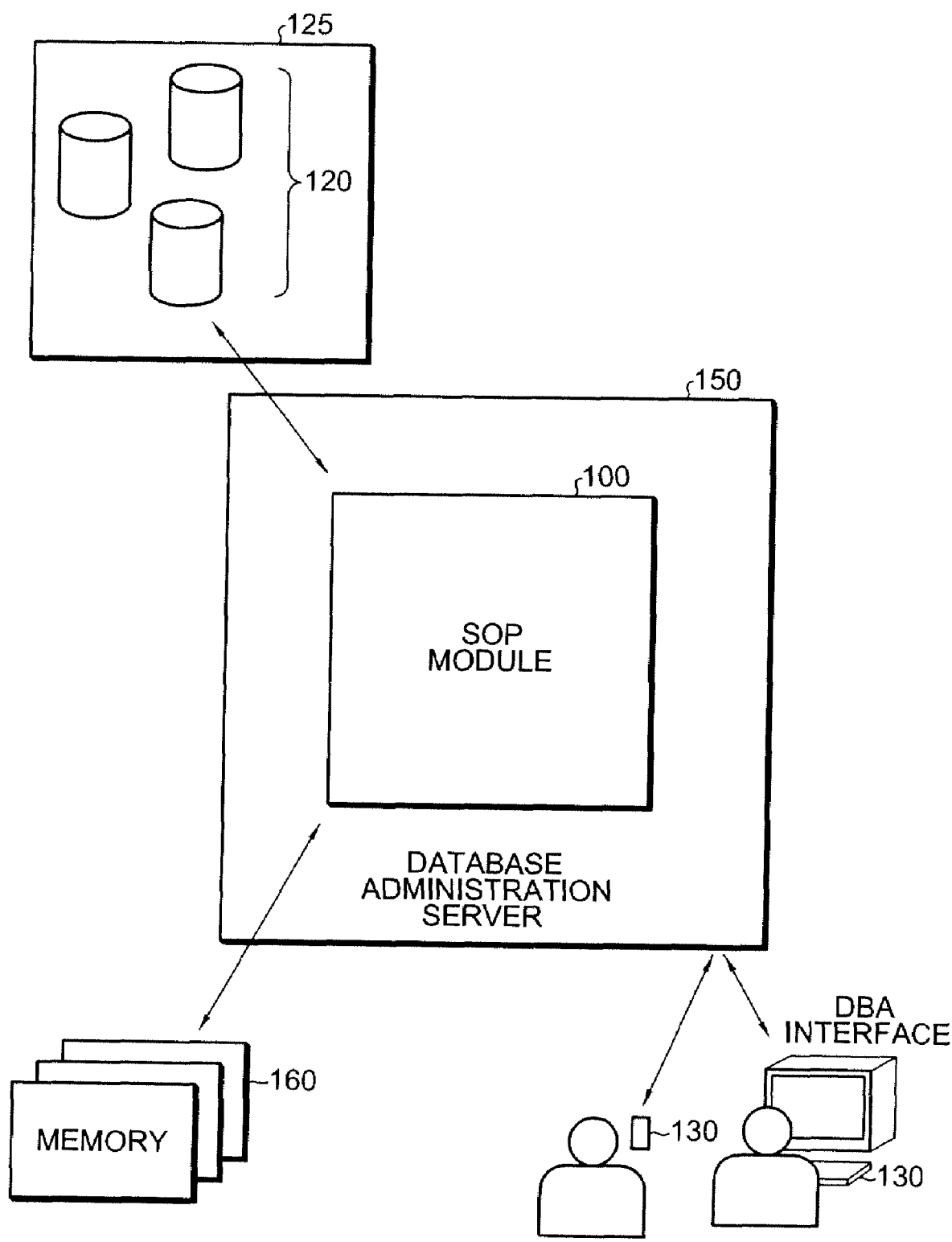
FIG. 1 shows a high level depiction of a database environment in which one embodiment of the present invention is implemented.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Specific embodiments of the present invention are hereafter described in detail with reference to the accompanying figures. Like elements in the various figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

A system for database administration, according to one embodiment of the present invention, is shown in FIG. 1. Interposed between a server 125 housing a plurality of databases 120 and one or more database administrator interfaces 130 is a SOP module 100 which, in this embodiment, is housed within a database administration server 150. Communicatively coupled to the database administration server 150 and thus in communication with the SOP module 100 are one or more memory resources 160 housing, among other things, a plurality of SOPs and task recipes.

Figure 2:
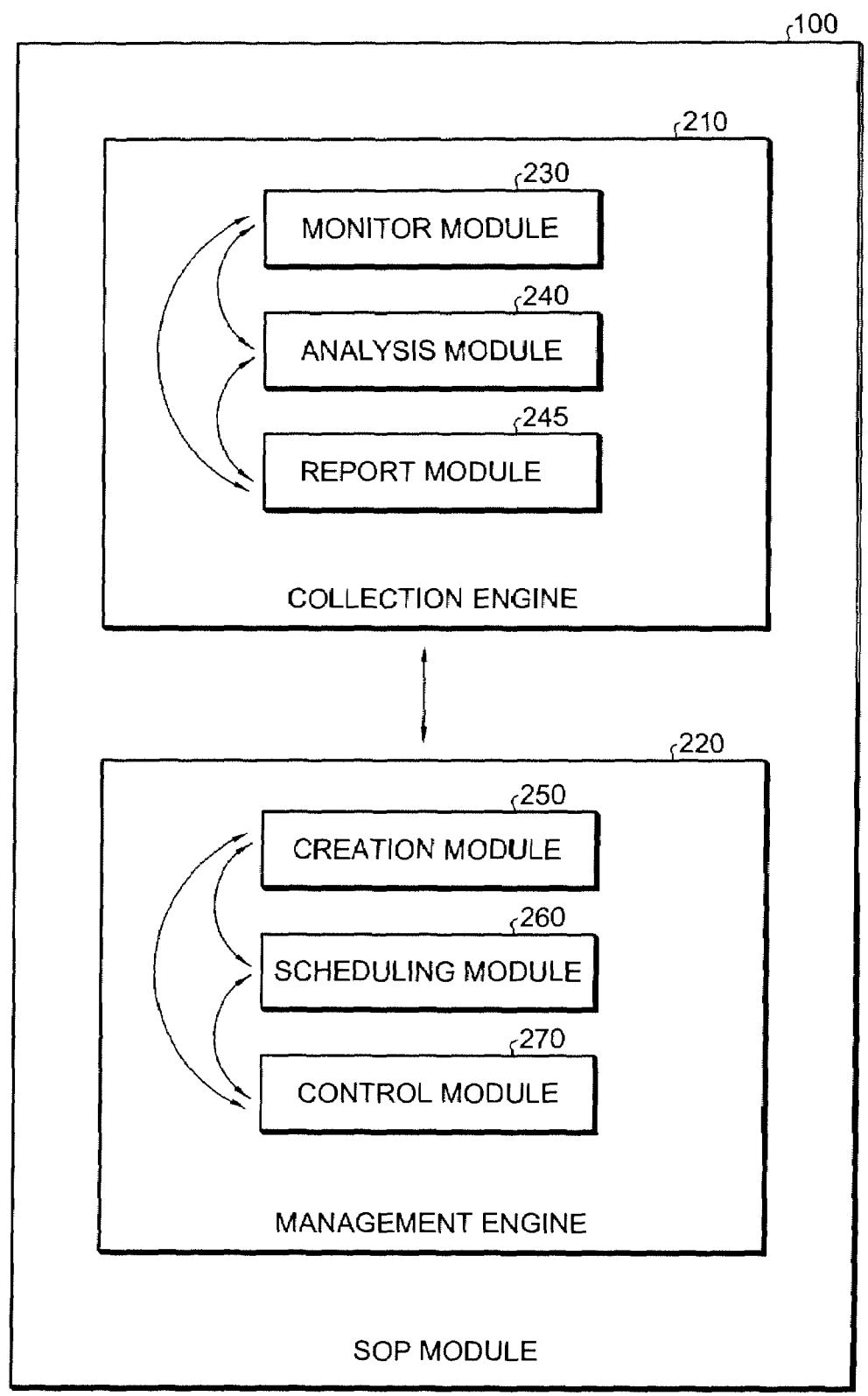
FIG. 2 shows a block diagram of a system architecture for a standard operating procedure module according to one embodiment of the present invention.

FIG. 2 shows an expanded version of one embodiment of the SOP module 100 of FIG. 1 according to the present invention. According to this embodiment of the present invention the SOP module 100 comprises a collection engine 210 and a management engine 220. The collection engine includes modules for database monitoring 230, analysis 240, and reporting 245 of, among other things, state information collected from each database. The management engine 220 includes a control module 270 for implementation of SOPs as well as a scheduling module 260 and a SOP creation module 250. Each module within each engine, and indeed both the collection engine 210 and the management engine 220, work together to administer each of the databases within the database environment.

As mentioned, collection engine 210 includes a monitoring module 230, an analysis module 240, and a reporting module 245. Each database operates on a specific platform and in many cases a unique operating system. Yet each database environment possesses state information reflecting its ability to carryout its assigned database role. This information includes data regarding the database itself as well as information regarding the operating system and platform on which the database exists/operates. The monitoring module 230, according to one embodiment of the present invention, identifies various state information and associates it with each specific database. Once identified, the monitor module 230 periodically collects state information regarding that database as well as any deltas ongoing in the database environment. The state information collected by the monitoring module 230 is stored in the memory resource 160 forming one or more separate repositories of information. One skilled in the relevant art will recognize that the memory resource 160 need not be a single memory medium. Indeed the memory resource 160 may comprise multiple storage mediums distributed throughout a distributed network such as in a storage area network or may reside in dedicated volumes of a storage medium at a single location.

Another aspect of the collection engine 210 is the analysis of the collected database state information so as to ascertain the health of the database and the database's ability to carry out its tasked operations. The analysis module 240 employs a plurality of mathematical models including linear regression, queuing theory, simulations (using various simulation techniques known in the art), fuzzy logic and the like. Each of these techniques used separately or in conjunction with one another (along with others known by one skilled in the relevant art of data analysis) aids the analysis module 240 in determining whether the database is performing optimally.

According to one embodiment of the present invention, the collection engine 210, via the products of the monitoring module 230 and the analysis module 240, creates an alert when it recognizes that the database fails to meet one or more pre-established criteria. The alert can be thereafter communicated to a DBA via the DBA interface 130 and/or be a trigger by which to initiate an automatic response. Indeed according to one embodiment of the present invention an alert issued by the collection engine 210 generates a tasking request automatically to address and heal the underlying cause of the alert. In such a manner the SOP module 100 provides an automatic means by which to identify database problems and fix them based on predetermined rules using predetermined scripts of specific SOPs.

Another aspect of the present invention includes rule sets used by the analysis module 240 to identify those aspects of the collected information forming the basis of an alert as well as what corresponding action to undertake once a condition has been identified. Rule sets are created and stored in the memory resource 160 along with the SOPs and the task recipes and are accessed by the analysis module 240 to identify symptoms of database problems. Identified symptoms are diagnosed and a plan of action is formulated to resolve the problem. As with SOPs, the rule sets can be fashioned to be universally applied to all databases or specific to a particular database environment. As with SOPs, rule sets can be modified by DBAs possessing proper privileges.

The collection engine 210 can, in another embodiment of the present invention, automatically gather environmental meta-data rather than hard-coded environmental properties. Indeed the collection engine 210 can collect information from the operating system on which the databases 120 operate as well as other applications on the database server 125. In this manner the collection engine 210 can capture the environment on which the database operates. This captured data can be further analyzed and/or reported. For example, in a DBClone call syntax, the source and target server and database names are passed as parameters. Other properties and environmental attributes regarding the source and target databases (such as database size, DBMS Vendor (Oracle, IBM DB2, MS SQL Server, etc.), software installation directory areas such as ORACLE_HOME values, data-file locations & sizes, etc.) are all maintained and retrieved from the memory resource 160. Such properties are referred to as meta-data. Automatically collecting and using such meta-data from the repository avoids human errors.

The reporting module 245 interacts with the monitoring module 230 and the analysis module 240 to prepare and present reports on the database environment. This, according to one embodiment of the present invention, can include database state information as well as metadata and other information about the database server 125. Furthermore, the reporting module 245 can, in another embodiment of the present invention, operate independent of the management engine 220 to provide the DBA with information regarding the environment of the database(s) 120. For example the monitoring module 230 can facilitate the collection of operating system information about the database server 125 to provide the DBA, or similar personnel, with reports regarding the environment in which the databases operate. These reports can be formatted and presented to the DBA in several configurations to facilitate database administration.

Beyond collecting and analyzing existing state information regarding each of the plurality of databases 120 that the SOP module 100 administers, the present invention also collects information regarding the status of ongoing and past execution of SOPs. According to one embodiment of the present invention the management engine 220 communicates with the collection engine 210 the issuance of SOPs to a particular database. Thereafter the collection engine 210 can monitor and collect data regarding the execution of those issued SOPs. Furthermore, the monitor module 230 directs database state information regarding the execution of a requested task to the memory resource 160 for storage and later analysis. The analysis module 240 thereafter can conduct an analysis of the database state information with respect to the tasked SOPs to determine whether the SOPs were effective. Reports in various formats conveying the results of such an analysis as generated by the reporting module 245 can be presented to a DBA via the DBA interface 130. Audits and compliance information regarding database performance can also be generated and reported via the report module 245. In another embodiment of the present invention, the collection of database state information reflective of the execution of a tasked SOP can be conveyed to and displayed by the DBA interface in real-time. This real-time presentation of the effectiveness of a particular SOP provides the DBA with useful feedback and assists in the DBA's determination of issuing (or cancelling) additional task requests.

The collection engine 210 works in conjunction with the management engine 220 to administer a plurality of databases. One aspect of the management engine 220 is the SOP creation module 250. According to one exemplary embodiment of the present invention SOPs are created by senior DBAs and stored within the memory resource 160 using the SOP creation module. The memory resource 160 is a separate data repository apart from the databases being administered. Each database environment typically includes a set of procedures that are followed on a day-to-day basis to configure and maintain each database. The SOP creation module 250 captures these procedures, as known by experienced and senior DBAs, and stores them in the memory resource 160. According to one embodiment of the present invention a template can be used to aid in the creation of a plurality of SOPs for a variety of database environments and for a variety of tasks. A plurality of best practice SOPs addressing a variety of situations for a variety of database types and environments are created and stored by the SOP creation module. Once created and stored, the memory resource 160 represents a repository of database administration knowledge. Overtime, modification of the existing SOPs combine the knowledge of multiple DBAs to arrive at effective and consistent database administration tools. According to another aspect of the present invention, existing SOPs can only be modified by certain DBAs. A security module (not shown) is coupled to the creation module 250 so as to limit editorial access to the existing SOPs. In that manner the quality of the SOPs can be maintained and controlled.

Database environments include databases managed using Oracle, DB2, MySQL and SQL Server technology. Each SOP is created, according to one embodiment of the present invention, so as to be compatible with each other SOP. In such a configuration SOPs can be linked together to accomplish various assigned tasks. In other embodiments SOPs are grouped based on a particular database environment so as to be compatible within that environment. This includes the policies that are prevalent for a particular database environment. Thus SOPs exist addressing multiple tasks for multiple database environments.

Another aspect of the SOP creation module 250, and according to one embodiment of the present invention, is the creation of a task recipe. A task recipe is a user friendly description of the functionality of each SOP and each task recipe, according to one embodiment of the present invention, is stored in the memory resource 160 associated with one or more SOPs. SOPs are often written in such a manner that fails to easily convey the outcome of executing such a SOP. This is because each SOP must be cognizant of the database environment in which it will be executed and with each other SOPs with which is must be compatible. While the meaning of such an SOP may be forthcoming to the senior DBA that created it, to a junior and unfamiliar DBA the value of such a SOP may be fleeting. The task recipe can be displayed and/or selected by a DBA via the DBA interface 130 to facilitate database administration. Thus a task recipe provides DBAs with all levels of experience an easily read and understood interpretation of the SOPs value.

Each task recipe corresponds to one or more SOPs and each SOP may be associated with one or more task recipe. As will be described more fully in the sections that follow, SOPs can be generally classified as either a task-based SOP or a healing-based SOP. Task based SOPs specify how and under what circumstances certain repetitive, time-consuming and/or man-power intensive database administration tasks are to be performed. Healing SOPs are designed to resolve an identified or prospective problem with a database. These problems are identified by the database monitoring 230 and analysis 240 modules.

The management engine also includes a scheduling module 260 and a control module 270. The scheduling module 260 acts to manage retrieval of particular SOPs from the memory resource 160 based on a task request. Task request can be received by the SOP module 100 by several means. As previously discussed, the issuance of an alert by the collection engine 210 can generate an automatic task response to resolve the alert. In another embodiment of the present invention, a user may manually issue a task request. Task requests can include, but are not limited to, database backups, database refreshes, database cloning, running database health-checks, managing database memory resource space, database coalescing, rebuilding fragmented database segments, analyzing database optimizer statistics, performing database root cause analysis, database patching, database upgrades, database migrations, and database server migrations. Each one of these, and other database tasks as would be known or contemplated by one skilled in the art, can be accomplished by one or more SOP.

The present invention, via the scheduling module 260, associates each task request with a task recipe and thereafter one or more appropriate SOP. For example, assume a junior DBA attempts to manage a particular database's memory resource space. Using the DBA interface 130 the junior DBA conveys a task request to the scheduling module 260 of the management engine 220. Based on the information provided by the DBA through the DBA interface 130, the scheduling module 260 determines what task recipes need be accomplished to meet the issued task request. In some cases a single recipe is necessary while in others a plurality of recipes may be involved.

A task recipe identifies for each particular database environment one or more SOP. Thus a task request for database memory management may be associated with several task recipes. Each task recipe may be in turn associated with several SOPs. These task recipes and SOPs may, in some instances, require execution in particular order. The scheduling module 260 undertakes this task for the DBA. Once the task request is received, the scheduling module 260 identifies which, if any, task recipes are involved, and based on the target database environment and policies, retrieves the appropriate SOPs from the memory resource 160. The scheduling module 260 can, when necessary, link SOPs/task recipes so as to accomplish a tasking request. In an alternative embodiment of the present invention, task recipes themselves are displayed to the DBA via the DBA interface 130. DBAs can choose from the listed task recipes for a particular database environment and in that manner, form a task request of manually linked SOPs.

Once the appropriate SOPs are retrieved, the scheduling module 260 ascertains the database's availability. As will be appreciated by one skilled in the art, the execution of some SOPs may impact the database's ability to perform its primary function. Thus the scheduling module 260, knowing the SOPs that are being directed toward a particular database, and knowing the extent of the impact the SOP may have on the database, schedules the implementation of the SOPs on the target database with the control module 270. Once scheduled, control of the execution of the SOPs on the target database is handled by the control module 270. In one embodiment of the present invention, the scheduling module 260 schedules the execution of task requests during one or more specific time intervals. For example, a database maintenance request may be scheduled to be executed during times when the database is idle. Alternatively, a tasking request may be reoccurring periodically so as to maintain the database in an optimal condition. According to another embodiment of the present invention, the scheduling module 260 may present to the control module 270 one or more SOPs to be executed on a database within a particular time window such as a time of known minimal operational impact. In such an instance the control module 270 is free to manage the execution of the SOP so long as it does so within the established criteria.

The scheduling module 260 can, in another embodiment of the present invention, manage operational conflicts with tasking requests. As a plurality of tasking requests are issued and targeted at one or more databases within a specific environment, a conflict may exist with respect to the execution of the SOPs. Also the operational impact executing a plurality of SOPs on a plurality of databases simultaneously may be unacceptable. Based on pre-established criteria for each database environment as contained in the database environment policies, the scheduling module 260 can prioritize and manage the execution of each SOP. Another aspect of the present invention is to provide each tasking request with a priority level. This priority level aids the scheduling module 260 in identifying the importance of an execution order and how it will impact operational constraints of a particular database. For example, a high priority tasking request may, based on database environment policies, be sufficient to remove the database from operational status while the appropriate SOPs are executed while a low priority tasking may be queued until the database is undergoing scheduled maintenance during a period of low activity.

The execution of the retrieved SOPs on the database is controlled by the control module 270. The control module 270 oversees the execution of the SOP on the module and establishes the necessary communicational links between the database administration server 150 and each database 120 as required. Once the SOPs are retrieved and scheduled, the control module 270 executes the SOP at the target database 120. In addition and according to one embodiment of the present invention, the control module 270 enables a DBA, via the DBA interface 130, to monitor the execution of the SOP on the database in real-time. As the execution is ongoing and state information is relayed back to the DBA interface 130, the DBA can make qualitative assessment as to the progress and effectiveness of the tasked SOPs. The SOP can also manually intervene (assuming the DBA possesses adequate privileges) in the execution of the SOP and, when necessary, modify the SOP in real-time.

According to another aspect of the present invention, the control module 270 automatically executes SOPs based on generated alerts or scheduled maintenance. Rather than receiving tasking responses from a DBA, the control module 270 receives alerts and corresponding tasking requests generated from the analysis module 240. Once received, the control module 270 acts as the authorizing entity based on pre-determined criteria and automatically executes the appropriate SOPs. In this manner, DBA interaction with day-to-day maintenance and other routine functions can be eliminated.

Prior to executing an SOP and according to another embodiment of the present invention, the control module 270 of the management engine 220 will check the current user's (DBAs) credentials and ensure that (s)he is authorized to execute an SOP for the specified platform. An underlying security table holds information on which users (DBAs) are allowed to view, create/modify SOPs, documents, or corresponding automation routines for a particular database. When a user wants to perform an action in the SOP Module 100 (view an SOP, create/edit an SOP or automation routine or run an SOP, etc), the user's username/password is checked. When this is accurate, privileges are retrieved and verified. When this person has the authority to read or write SOPs for that database (s)he is allowed to view or modify SOPs and related objects. Should the privileges allow, the user may be authorized to execute SOPs for a particular database and/or to run an SOP for that database.

The DBA interface 130 acts as a gateway for DBAs to create, manage and interact with the SOP module 100. The DBA interface 130 also can act as a means by which to present to a DBA reports regarding database state information and other related data as generated by the report module 245. According to one embodiment of the present invention, the DBA interface 130 may be a personal computer, personal data accessory (hand held device) or similar apparatus coupled to a network capable of communicating with the database administration server 150 and there-through the plurality of databases 120. Although not required, the invention can be described in the general context of computer-executable instructions, such as program modules, being executed by a personal computer or server including the DBA interface 130 and the database administration server 150. Thus one or more modules associated with the SOP module 100 may reside on and be executed by the DBA interface 130. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The present invention may also be practiced in distributed computing environments where tasks are performed by remote processing devices that are linked through a communications network. In a distributed computing environment, program modules may be located in both local and remote memory storage devices yet remain separate from the database environment.

An exemplary system for implementing the invention includes a general purpose computing device in the form of a conventional personal computer or the like acting as the DBA interface 130. Such a computer includes a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read-only memory (ROM) and random access memory (RAM). The DBA interface 130 may further include a hard disk drive for reading from and writing to a hard disk, a magnetic disk drive for reading from or writing to a removable magnetic disk, and an optical disk drive for reading from or writing to a removable optical disk such as a CD-ROM, Solid State Drives or other optical media. The hard disk drive, magnetic disk drive, and optical disk drive are connected to the system bus by a hard disk drive interface, a magnetic disk drive interface, and an optical drive interface, respectively. The drives and their associated computer-readable media provide non-volatile storage of computer readable instructions, data structures, program modules and other data for the personal computer. Although the exemplary environment described herein employs a hard disk, a removable magnetic disk and a removable optical disk, it should be appreciated by those skilled in the art that other types of computer readable media which can store data that is accessible by a computer, such as magnetic cassettes, flash memory cards, Solid State Drives, digital video disks, Bernoulli cartridges, random access memories (RAMs), read-only memories (ROMs) and the like may also be used in the exemplary operating environment.

A number of program modules including those of the SOP module 100, collection engine 210 and the management engine 220 may be stored on a hard disk, magnetic disk, optical disk, ROM or RAM. A DBA may enter commands and information into the DBA interface 130 through input devices such as a keyboard and pointing device. Other input devices (not shown) may include a microphone, joystick, game pad, satellite dish, scanner or the like. These and other input devices are often connected to the processing unit through a serial port interface that is coupled to the system bus, but may be connected by other interfaces, such as a parallel port, game port or universal serial bus (USB). A monitor or other type of display device is also connected to the system bus via an interface, such as a video adapter. In addition to the monitor, personal computers like the DBA interface 130 typically include other peripheral output devices, such as speakers, printers, mobile phones, and other hand held devices.

The DBA interface 130 may operate in a networked environment using logical connections to one or more remote computers, such as the database administration server 150. The database administration server 150, or any other remote computer affiliated with the database administration system 100 may be another personal computer, a server, a router, a network PC, a peer device or other common network node, and typically includes many or all of the elements described above relative to the personal computer. The DBA interface 130 and database administration server 150 further include logical connections so as to be able to communicate via a local area network (LAN) and (in necessary) a wide area network (WAN). Such networking environments are commonplace in offices, enterprise-wide computer networks, Intranets and the Internet.

When used in a LAN networking environment, the DBA interface 130 is connected to the local network through a network interface or adapter. When used in a WAN networking environment, the DBA interface 130 typically includes a modem or other means for establishing communications over the wide area network, such as the Internet. The modem, which may be internal or external, is connected to the system bus via the serial port interface. In a networked environment, program modules depicted relative to a personal computer, or portions thereof, may be stored in the remote memory storage device.

As suggested, the DBA interface 130 may also serve as a network gateway. As a gateway the DBA interface 130 may also be directly coupled to one or more devices using a communications link. Although not shown in FIG. 1, the DBA interface 130 may also be coupled to a storage device (such as the memory resource 160).

Those skilled in the art will appreciate that the DBA interface 130 may be located a great geographic distance from the plurality of databases 120, the database administration server 150 or the memory resource 160, and similarly, each of these devices may be located a substantial distance from each other. For example, the database administration server 150 may be located in California, while the DBA interface 130 may be located in Texas, and one or more of the databases 120 may be located in New York.

In preferred embodiments, the present invention is implemented in software. Software programming code which embodies the present invention is typically accessed by the microprocessor (e.g. of the DBA interface 130 and/or database administration server 150) from long-term storage media of some type, such as a CD-ROM drive, Solid State Drive, or hard drive. All SOPs are coded within the DBA interface 130 in an open, industry-standard scripting language (such as Python, Perl or JavaScript.) Korn Shell (ksh) can also be used since it is available on most UNIX and Linux platforms and a specific flavor of ksh is also available for Windows environments. Alternatively, batch (.bat or .cmd) scripts or JavaScript can be written for Windows. Or Perl or Python can be used universally for all database environments. The present invention enables automation routines to be created in simple scripting languages that DBAs will understand and follow, thereby allowing them to customize any SOPs prior to their utilization. Any SOP automation scripts that require confidential data such as certain file-locations to be embedded within them can be written in a compiled language such as C to avoid such information from being exposed (as in a script).

The software programming code may be embodied on any of a variety of known media for use with a data processing system, such as a diskette, hard drive, flash drive, or CD/DVD-ROM. The code may be distributed on such media, or may be distributed from the memory or storage of one computer system over a network of some type to other computer systems for use by such other systems. Alternatively, the programming code may be embodied in memory, and accessed by a microprocessor. The techniques and methods for embodying and distributing software programming code in memory and/or on physical media are well known and will not be further discussed herein.

A user of the present invention (e.g. a DBA) may connect his computer to a server using a wireline connection, or a wireless connection. (Alternatively, the present invention may be used in a stand-alone mode without having a network connection.) Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer (ie. DBA interface 130) may be any type of computer processor, including laptop, handheld or mobile computers; vehicle-mounted devices; desktop computers; mainframe computers; etc., having processing capabilities (and communication capabilities, when the device is network-connected). The remote server, similarly, can be one of any number of different types of computers which have processing and communication capabilities. These techniques are well known in the art, and the hardware devices and software which enable their use are readily available.

When implemented in software, the present invention may be implemented as one or more computer software programs and preferably implemented using an object-oriented programming language. The model which is used for describing the aspects of software installation packages is preferably designed using object-oriented modeling techniques of an object-oriented paradigm. In preferred embodiments, the objects which are based on this model, and which are created to describe the installation aspects of a particular installation package, may be specified using a number of approaches, including structured markup language documents (such as XML documents); object descriptors of an object modeling notation; or Object REXX or objects in an object scripting language having similar characteristics.

An implementation of the present invention may be executed in a Web environment, where software installation packages are downloaded using a protocol such as the HyperText Transfer Protocol (HTTP) from a Web server to one or more target computers which are connected through the Internet. Alternatively, an implementation of the present invention may be executed in other non-Web networking environments (using the Internet, a corporate intranet or extranet, or any other network) where software packages are distributed for installation using techniques such as Remote Method Invocation ("RMI") or Common Object Request Broker Architecture ("CORBA"). Configurations for the environment include a client/server network, as well as a multi-tier environment. Or, as stated above, the present invention may be used in a stand-alone environment, such as by an installer who wishes to install a software package from a locally-available installation media rather than across a network connection. Furthermore, it may happen, although not recommended, that the client and server of a particular installation both reside in the same physical device, in which case a network connection is not required. (Thus, a potential target system being interrogated may be the local device on which an implementation of the present invention is implemented.)

As previously discussed, tasking requests can be generally categorized as task-based request or a healing request. Task-based SOPs or Auto-Tasks are SOPs that specify how and under what circumstances certain repetitive, time-consuming and/or manpower-intensive DBA tasks are to be performed. Task-based requests include, but are not limited to doing a backup, cloning a database, database health checks, database coalescing, rebuilding fragmented or invalid database segments, data pruning and database memory space allocation.

Backing up a database is one the most common and routine tasks of a DBA. According to one embodiment of the present invention, the SOP module 100 would initiate the appropriate backup mode (say, Oracle RMAN, hot backup script, cold backup, data export, etc.), alerting the on-call DBA should the backup SOP fail to initiate or hang up during execution. The backup also parses the backup log to ensure backup was successful. When the backup fails due to a pre-determined condition, such as full disk-space, this condition can be identified to the control module 270 and a follow-on automated SOP can be triggered to free up space. Environment-specific pre- and post-tasks can be added to further customize the SOP routine prior to implementation.

Database cloning includes refreshing the environment with an appropriate backup (previous night or a specific earlier date), confirming the refresh was successful, renaming files or moving files to other locations when required, etc. This SOP can also be customized to perform certain environment / application specific pre- and post-refresh tasks.

Task-based SOPs also include running a release in the database by extracting the right code module and version, scheduling it to run during a pre-determined release window and reporting on the results. When the execution was not successful, a follow-on SOP can be run to rollback the release.

Healing actions are formed based on correcting an identified database problem. These SOPs can be automatically triggered in response to a problem alert or manual DBA action. When a SOP fails, then a follow-on SOP can be triggered or as a last resort, human DBAs are alerted in a pre-approved escalation format. In most problem cases healing action SOPs resolve problems without human intervention. Regardless of whether the problem is successfully resolved by the healing action or not, a trouble-ticket is created and saved either within the memory resource 160 for later access, and/or redirected to a pre-configured customer trouble-ticketing system. This information is provided to relevant DBA personnel conveying that such a problem occurred, the results of any resolution attempts, and a timestamp for the problem and resolution.

As previously discussed with respect to the monitor module 230 and the analysis module 240, healing actions can be triggered in response to certain events being monitored. Each of these events is defined in one or more rule sets. A rule set comprises one or more individual rules. Like SOPs and task recipes, rule sets are created by senior DBAs and stored in the memory resource 160.

Healing actions include but are not limited to starting or restarting a database, resolving locking conflicts, resolving space and segment errors, and excessive user response times or excess queues.

According to one embodiment of the present invention an SOP would define how the DBA should react when he/she finds that a database is down. For instance, during certain times of the day or week, a cold backup could be in progress and hence the database could be down (non-operational). The tasked SOP in this case, would define, based on a service level agreement, when the database is expected to be up versus down and what processes need to be started up at the database (like the listener, the Names/LDAP server, etc.) and what sequence needs to be followed in starting up these processes. Such procedures may vary from site to site or application to application and as such, they need to be documented in the form of an SOP and followed by all DBAs working at that site. Based on such an SOP, the healing action would attempt to restart the database and any associated processes.

Similarly and according to other embodiments of the present invention, healing action SOPs work to resolve locking conflicts (deadlocks or blocked locks, etc.), space (or lack thereof) errors and segment errors. Another aspect of healing tasks is to resolve excessive response or access time. When user response time or transaction queues begin to exceed a certain threshold a healing task may be initiated to resolve such a problem. Situations such as nightly data load process aborts due to too many data errors in the incoming data stream (such as duplicate records or orphaned records) or the nightly data load process running longer than it normally does and thus running into the next job window (such as a pre-scheduled backup causing both jobs to now run slowly and into business hours) are examples of timing issues that can be resolved by healing task SOPs.

According to one embodiment of the present invention an application programming interface (API) can be invoked within the SOP Module 100 or by other third party application in the enterprise (such as Kintana, AutoSys, cron, etc.) via standard API syntax. For example, when executing an SOP, the SOP name is referred to (as the API name) and appropriate parameters are passed with the call. Any SOP API call can request a valid username/password, unless the calling username is part of a pre-authorized operating system group (on UNIX and Windows only). In such a case, no password would be expected, but a username still is required for validation and privilege verification.

Figure 3A:
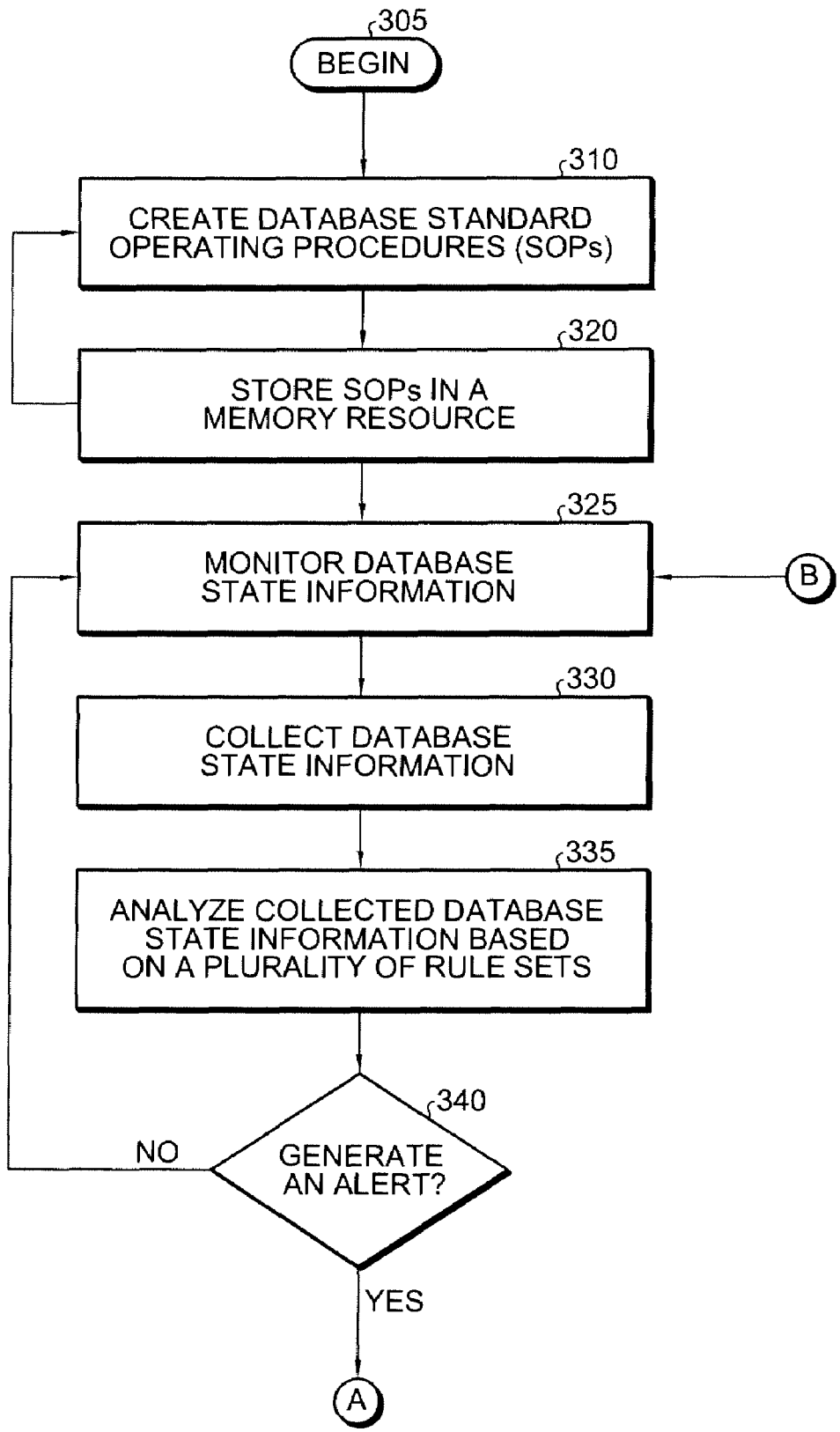
FIG. 3 is a flow chart of one method embodiment for database administration using automated standard operating procedures according to the present invention.
Figure 3B:
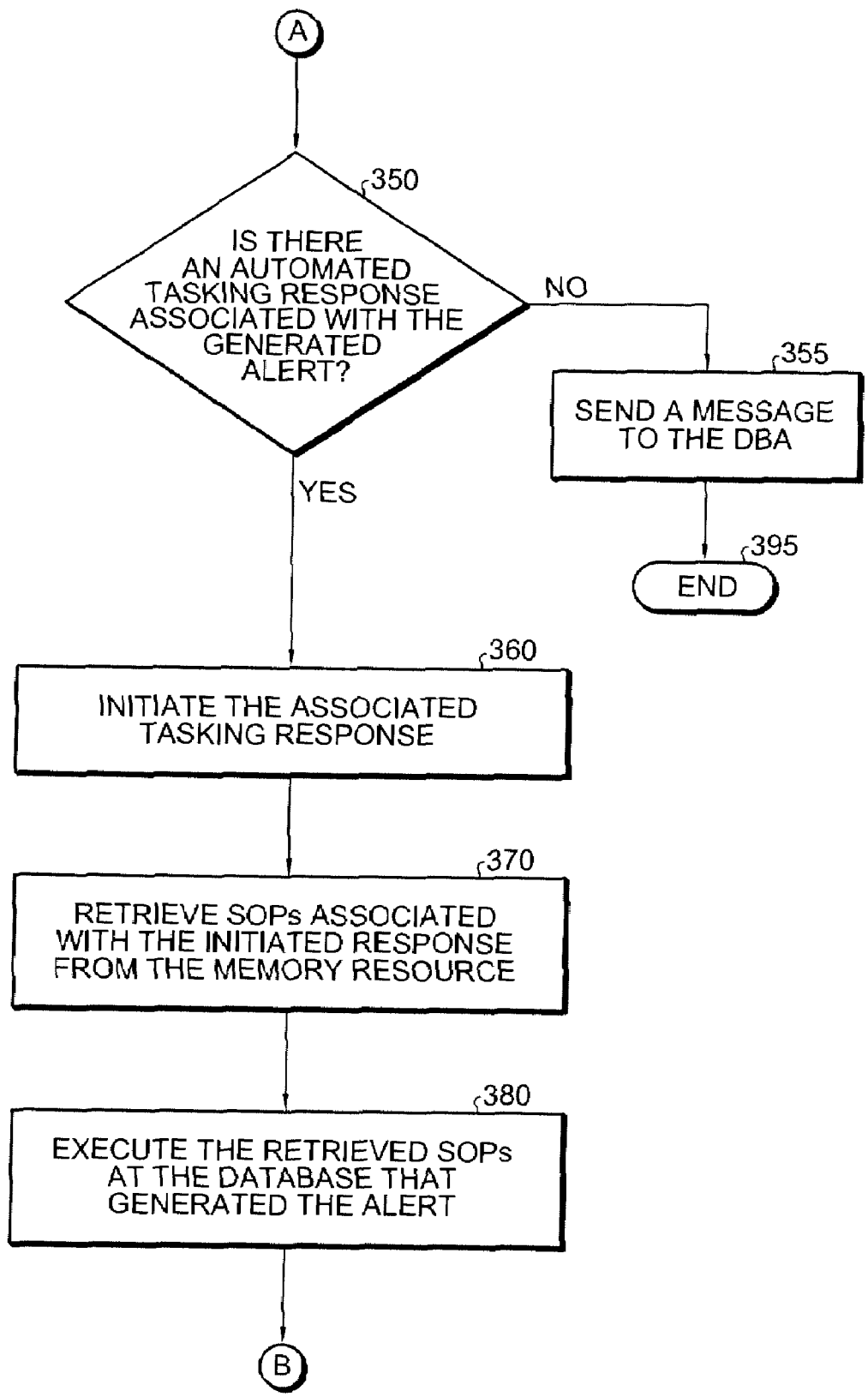
Figure 4A:
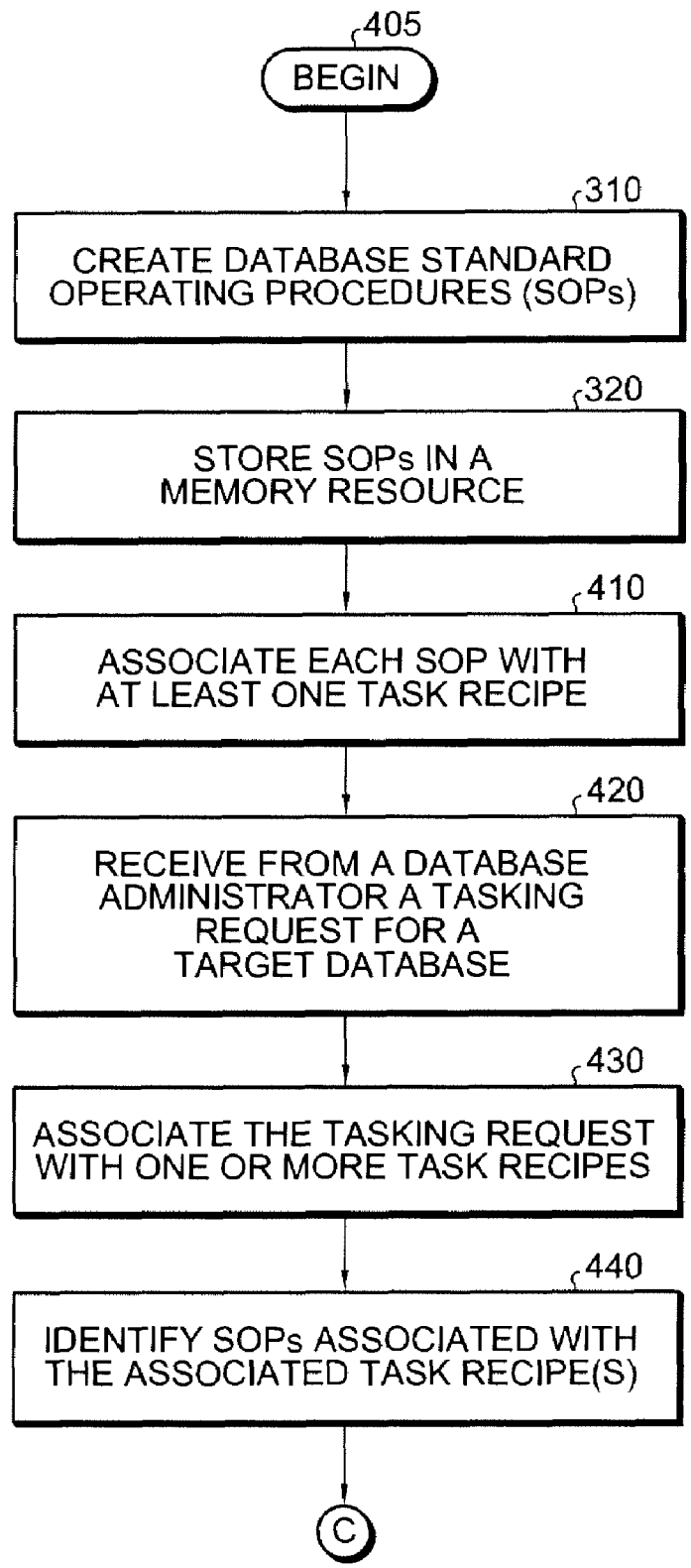
FIG. 4 is a flow chart of one method embodiment for database administration using standard operating procedures in response to a received tasking request, according to the present invention.
Figure 4B:
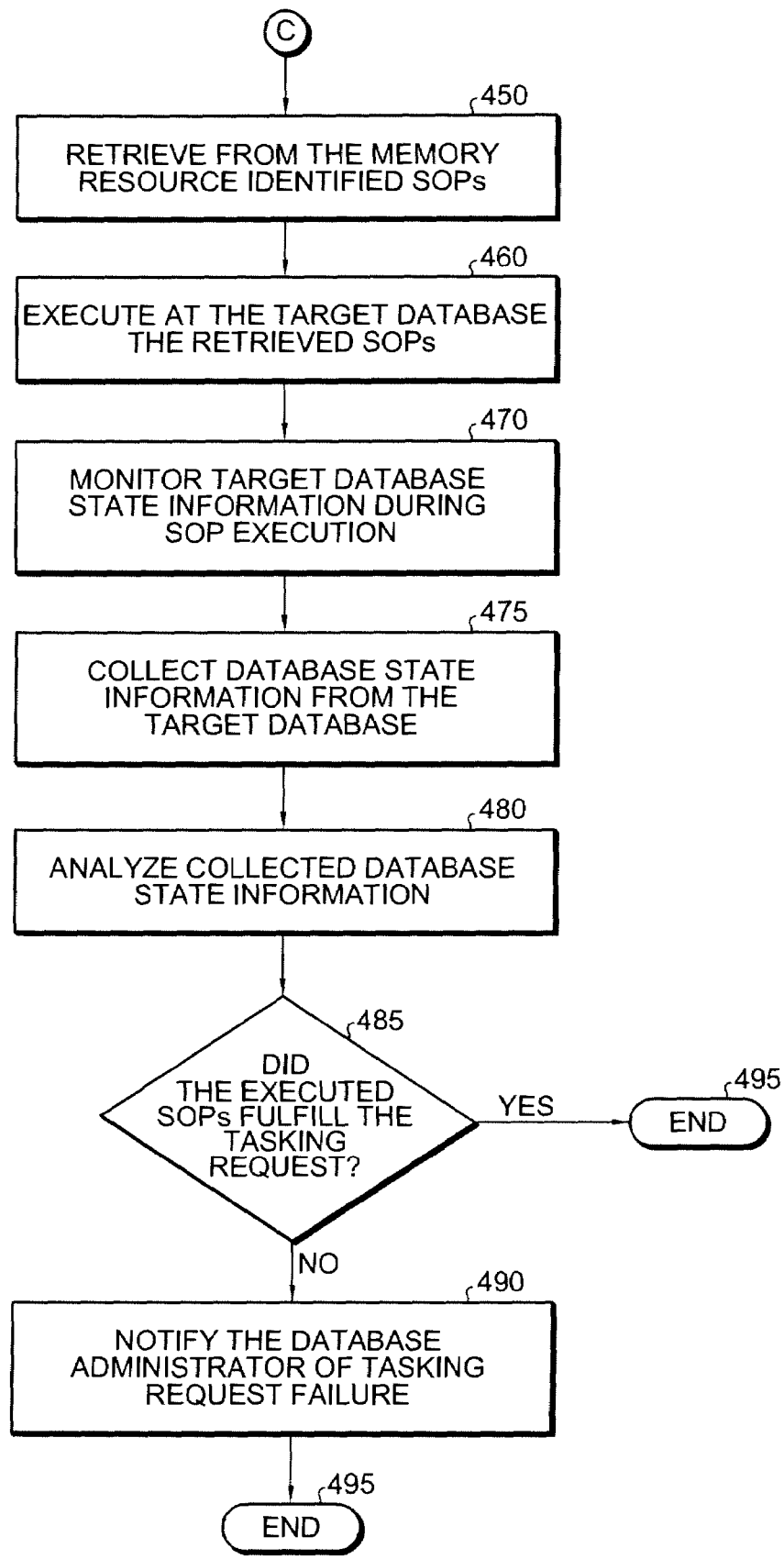

FIGS. 3 and 4 are flowcharts illustrating methods of implementing an exemplary process for database administration. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 3 is a flow chart of one method embodiment of the present invention for database administration using automated standard operating procedures. The process begins 305 with the creation 310 of one or more SOPs. Associated with each SOP can be one or more task recipe. The task recipe is a user friendly natural language description of the functionality of each SOP. The creator or, in some instances, the editor, of the SOP identifies database environments in which the SOP may be utilized and other SOPs that may be/are compatible with the SOP. Once created, each SOP, and its associated task recipe, is stored 320 on a memory resource. According to one embodiment of the present invention, the memory resource housing the SOP repository and the task recipe repository among other things is separate from the targeted databases and the SOP module.

According to one embodiment of the present invention the creation and storage of SOPs is ongoing, in that as more expertise is gained and/or other database environments are considered, new and improved SOPs are added to the repository. In this manner DBAs accessing the repository to create tasking requests or tasking response can choose from a plurality of SOPs offering a multitude of best practices.

While the SOP repository grows, the state information of each database under the care of the SOP module 100, is monitored 325. State information from each database is periodically collected 330 and stored at the memory resource 160. This collected state information is, according to one embodiment of the present invention, analyzed using various mathematical techniques as disclosed herein, and based on rule sets established by DBAs. Each rule set determines which parameters of database state information or deltas in such information, trigger a response from the SOP module. As the state information is being analyzed a query 340 is placed based on the rule set to determine whether an alert should be generated. When the response to the query is negative, the collection engine 210 continues to monitor, collect and analyze database state information.

When the response to the query 340 is affirmative the management engine 220 responds by issuing an alert. Based on at least one of the rule sets the control module 270 and the scheduling module 260 of the management engine ascertains 350 whether an automated tasking response is associated with the generated alert. When the answer is negative and no automated response is available, a message is sent 355 to the DBA alerting the DBA that a situation has arisen for which no automated response is available, and thus ending the process 395.

However, when a tasking response is associated with the alert, a tasking is initiated 360 within the management engine 220 to address the problem. SOPs associated with the response are retrieved 370 from the memory resource 160 and thereafter executed 380 on the target database. During and subsequent to the execution of the SOPs the method returns to monitoring collection and analysis state information so as to ascertain the effectiveness of the response. Assuming the response was effective to alleviate the problem, the next collection and analysis of state information should act to remove the issued alert, thus indicating a successful response.

FIG. 4 is a flow chart of another method embodiment for database administration using standard operating procedures in response to a received tasking request. As with the previous method, DBAs create 310 SOPs addressing a plurality of database administrational tasks. Each of the created SOP can be associated 410 with one or more task recipes and each of the one or more SOPs can be linked with other SOPs. The SOPs may be universal in nature or specific to a particular database type, platform or environment.

Once created, the SOPs are stored 320 in a memory resource 160 creating a SOP/task recipe repository. The memory resource 160 is configured and located (networked) in such a manner that it is accessible from multiple DBA interfaces 130. In such a way the repository serves as a centralized source of knowledge from which a DBA can consistently and efficiently administer a plurality of databases 120.

According to one embodiment of the present invention, a DBA, using the DBA interface 130, initiates a tasking request with respect to the one or more databases 120. Upon receiving 420 the tasking request, the SOP module 100 attempts to parse the request and associate 430 each part with one or more task recipe. Thereafter SOPs identified 440 with each task recipe are retrieved 450 from the memory resource 160. The management engine 220 thereafter can prioritize and schedule the SOPs based on the targeted database environmental policies and the requested task. SOPs can be linked together and/or managed separately by the SOP module 100/initiating DBA.

Once retrieved and scheduled, the SOPs are executed 460 at the database. Again the collection engine 210 monitors 470 database state information. Information regarding the database is collected 475 and analyzed 480 to ascertain whether the executed SOPs fulfilled the tasking request 485. When the analysis reveals that the execution has been successful and that the tasking request has been meet, the process ends 495.

When the query 485 reveals that the execution of the scheduled SOPs has not addressed the tasking request, a message is generated and communicated to the requesting DBA thus providing notification 490 of the failure. The process, thereafter, ends 495. According to another embodiment of the present invention, an additional query is interposed before termination 495 of the process, asking whether state information of the database as a result of the failed tasking request presents a situation that can be addressed by an automated tasking response. If so, an automatic tasking response is generated and executed so as to place the database in the desired configuration.

Indeed manually requested and managed tasking requests by a DBA can work in concert with automated tasking responses. As will be appreciated by one skilled in the relevant art, the monitoring, collection, and analysis functionality of the SOP module 100 as well as the SOP module's ability to automatically and manually respond to tasking requests, being generated by a DBA or by the SOP module itself, facilitates a very robust and flexible means by which to administer a plurality of diverse databases.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer system for managing a database environment, the computer system comprising:
   a machine capable of executing instructions embodied as software; and
   a plurality of software portions, including
   one of said software portions configured to create a plurality of standard operating procedures ("SOPs") wherein each SOP defines one or more procedures to address a specific state of the database environment or perform a requested task within the database environment and is associated with a database type and each database type associated SOP is further associated with, and compatible with, database environment policies and wherein each database type associated SOP is compatible with each other SOP associated with that database type;
   one of said software portions configured to create a plurality of task recipes wherein each task recipe includes a tasking request identifying at least one SOP;
   one of said software portions configured to store in a memory the plurality of SOPs and the plurality of task recipes;
   one of said software portions configured to monitor state information about the database environment including information to assess operational readiness of the database environment to execute at least one of the plurality of SOPs and information to enable real-time modification of each of the plurality of SOPs;
   one of said software portions configured to determine whether said monitored state matches a predefined rule set and responsive to said monitored state matching said rule set automatically initiating a responsive tasking request;
   one of said software portions configured to receive an external tasking request based on a task recipe;
   one of said software portions configured to prioritize each tasking request based on database environment policies;
   one of said software portions configured to identify a subset of the plurality of SOPs associated with each tasking request;
   one of said software portions configured to retrieve the subset of the plurality of SOPs from the memory for each tasking request;
   one of said software portions configured to prioritize each SOP in each subset of the plurality of SOPs and responsive to a conflict existing between two or more prioritized SOPs and/or tasking requests, resolving the conflict based on pre-established criteria;
   one of said software portions configured to execute the subset of the plurality of SOPs on the database environment as prioritized
   one of said software portions to determine whether execution of the subset of the plurality of SOPs on the database environment has addressed the associated tasking request.

2. The computer system of claim 1 wherein SOP creation includes the creation of a corresponding task recipe in human readable format.

3. The computer system of claim 1 further comprising one of said software portions configured to execute said tasking request based on a specific time interval.

4. The computer system of claim 1 wherein each rule set determines which parameters of state information about the database environment, or deltas in such information, trigger a SOP response of the responsive tasking request.

5. The computer system of claim 4 wherein one or more of said SOPs of said subset of the plurality of SOPs identified with said responsive tasking request receives one or more real time metadata injections regarding the database environment prior to and during SOP execution.

6. The computer system of claim 1 further comprising a software portion configured to collect and store at a central repository a result-set of data from said execution of said subset of the plurality of SOPs.

7. The computer system of claim 1 wherein SOP creation and modification is limited to designated senior database environment administrators.

8. The computer system of claim 1 wherein at least one of the plurality of SOPs is a task-based SOP.

9. The computer system of claim 8 wherein task based SOPs are configured to perform database administration tasks selected from a list consisting of database backup, database refreshes, database cloning, running a database health-check, managing database memory resource space, database coalescing, rebuilding fragmented database segments, analyzing database optimizer statistics, performing database root cause analysis, database patching, database upgrades, database migrations, and database server migrations.

10. The computer system of claim 1 further comprising a software portion configured to analyze the monitored state information to determine the database environment's capability to conduct tasked operations.

11. The computer system of claim 10 wherein at least one of the plurality of SOPs is a healing SOP to correct the database environment's failure to conduct tasked operations.

12. The computer system of claim 11 wherein the healing SOPs are triggered by altered database environment state information.

13. The computer system of claim 1 wherein SOPs are stored separate from the database environment.

14. The computer system of claim 1 wherein monitoring identifies database environment failure and creates an alert based on a pre-defined rule set.

15. The computer system of claim 1 wherein state information about the database environment is periodically collected for future analysis.

16. The computer system of claim 15 wherein analysis of database environment state information uses a plurality of mathematical models including linear regression, queuing theory, simulation, and fuzzy logic to predict future database state and performance.

17. The computer system of claim 1 further comprising a software portion configured to link a first subset of SOPs to a second set of SOPs to accomplish the requested task.

18. The computer system of claim 17 wherein subsets of SOPs include SOPs associated according to a particular database environment task.

19. The computer system of claim 1 wherein designated SOPs are executed automatically based on pre-determined state information of the database environment.

20. The computer system of claim 1 wherein a database administrator can monitor execution of SOPs at the database environment real-time and provide manual intervention.

21. The computer system of claim 1 further comprising a software portion configured to generate an audit trail of monitored database environment state information and SOP execution on the database environment.

22. A computer implemented method for managing a database environment, the method comprising:
- monitoring state information about the database environment;
- collecting state information about the database environment;
- determining whether said collected state information matches a predefined rule set and responsive to said collected state information matching said rule set automatically initiating a responsive tasking request;
- receiving said responsive tasking request based on collected state information about the database environment;
- receiving an externally initiated tasking request directed to the database environment;
- retrieving from a storage medium at least one of a plurality of standard operating procedures ("SOPs") based on each received tasking request wherein each associated SOP defines procedures to address a specific state of the database environment or perform a requested task within the database environment and is associated with a database type and each database type associated SOP is further associated with, and compatible with, database environment policies;
- prioritizing each SOP of the plurality of SOPs and responsive to a conflict existing between two or more prioritized SOPs and/or tasking requests, resolving the conflict based on pre-established criteria;
- at the database environment, executing the at least one of a plurality of SOPs
- determining whether execution of the at least one of the plurality of SOPs on the database environment has addressed the associated tasking request.

23. The computer implemented method of claim 22, wherein retrieving from said storage medium includes at least one task recipe corresponding to the at least one of the plurality of SOPs.

24. The computer implemented method of claim 22, wherein the responsive tasking request is automatically generated during runtime based on an analysis of collected state information.

25. The computer implemented method of claim 22, wherein the at least one SOP based on said responsive tasking request receives one or more real time metadata injections regarding the database environment prior to and during SOP execution.

26. The computer implemented method of claim 22, wherein the at least one SOP is linked with at least another SOP based on the responsive tasking request.

27. The computer implemented method of claim 22, wherein SOP creation and modification is limited to authorized database administrators.

28. The computer implemented method of claim 22, wherein the at least one SOP performs a database administration task selected from a list consisting of database backup, database cloning, running a database health-check, managing database memory resource space, database coalescing, rebuilding fragmented database segments, performing database root cause analysis, analyzing database optimizer statistics, database patching, database upgrades, data migration, and database server migration.

29. The computer implemented method of claim 22, further comprising analyzing collected state information to determine the database environments inability to conduct tasked operations based on a pre-defined rule set.

30. The computer implemented method of claim 29, wherein the least one SOP is a healing SOP to correct the database environments inability to conduct tasked operations.

31. The computer implemented method of claim 29, wherein responsive to determining the database environments inability to conduct tasked operations, creating an alert.

32. The computer implemented method of claim 22, wherein the analyzing of collected state information employs mathematical models including fuzzy logic, linear regression, ratio modeling or queuing theory.

33. The computer implemented method of claim 22 further comprising linking a first subset of SOPs to a second set of SOPs to accomplish the responsive tasking request.

34. The computer implemented method of claim 22, wherein the at least one SOP is executed at the database environment automatically based on pre-determined state information about the database environment.

35. The computer implemented method of claim 22, wherein a database administrator can monitor execution of the at least one SOP at the database environment real-time and when necessary manually intervene in the SOP's execution.

36. The computer implemented method of claim 22, further comprising generating an audit trail of monitored database environment state information and SOP execution at the database environment.

37. A computer-readable storage medium tangibly embodying a program of instructions executable by a machine wherein said program of instruction comprises a plurality of program codes for managing a database environment, said program of instructions comprising:
- program code for creating a plurality of database standard operating procedures ("SOPs") wherein each SOP defines procedures to address a specific state of the database environment or perform a requested task within the database environment and is associated with a database type and each database type associated SOP is further associated with, and compatible with, database environment policies and wherein each database type associated SOP is compatible with each other SOP associated with that database type;
- program code for creating a plurality of task recipes wherein each task recipe includes a tasking request identifying at least one SOP;
- program code for storing in a memory the plurality of SOPs and the plurality of task recipes;
- program code for collecting state information about the database environment including information to assess operational readiness of the database environment to execute at least one of the plurality of SOPs and information to enable real-time modification of each of the plurality of SOPs;
- program code for determining whether said collected state information matches a predefined rule set and responsive to said collected state information matching said rule set automatically initiating a tasking request;
- program code for receiving an externally initiated tasking request;
- program code for identifying a subset of the plurality of SOPs associated with each tasking request;
- program code for retrieving each subset of SOPs from the memory;
- program code for prioritizing each SOP in each subset of SOPs and responsive to a conflict existing between two or more prioritized SOPs and/or tasking requests, resolving the conflict based on pre-established criteria;

program code for automatically executing the subset of SOPs on the database environment, and program code for determining whether execution of the subset of SOPs on the database environment has addressed the associated tasking request.

38. The computer-readable storage medium of claim 37 wherein the program code for creating includes creating task recipes in human readable format corresponding to each SOP.

39. The computer-readable storage medium of claim 37 wherein said tasking request is generated automatically at runtime based on state information about the database environment.

40. The computer-readable storage medium of claim 37 wherein each rule set determines which parameters of state information about the database environment, or deltas in such information, trigger a SOP response associated with the tasking request.

41. The computer-readable storage medium of claim 40 wherein one or more of said SOPs of said subset of the plurality of SOPs identified with said tasking request receives one or more real time metadata injections regarding the database environment prior to and during SOP execution.

* * * * *